(12) United States Patent
Landau

(10) Patent No.: US 9,875,016 B2
(45) Date of Patent: Jan. 23, 2018

(54) METHOD AND SYSTEM FOR PERSISTENT ANCILLARY DISPLAY SCREEN RENDERING

(71) Applicant: Rakuten Kobo Inc., Toronto (CA)

(72) Inventor: Benjamin Landau, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 118 days.

(21) Appl. No.: 14/609,958

(22) Filed: Jan. 30, 2015

(65) Prior Publication Data

US 2016/0225345 A1   Aug. 4, 2016

(51) Int. Cl.
*G06F 3/0488* (2013.01)
*G06F 3/0483* (2013.01)
*G06F 3/147* (2006.01)
*G06F 1/16* (2006.01)

(52) U.S. Cl.
CPC .......... *G06F 3/0488* (2013.01); *G06F 1/1647* (2013.01); *G06F 1/1692* (2013.01); *G06F 3/0483* (2013.01); *G06F 3/147* (2013.01); *G09G 2330/021* (2013.01); *G09G 2330/022* (2013.01); *G09G 2360/144* (2013.01); *G09G 2380/14* (2013.01)

(58) Field of Classification Search
CPC .......... G06F 17/24; G06F 17/241; G06F 5/00; G06F 3/048; G06F 3/00
USPC ........................... 715/230, 768, 746; 345/204
See application file for complete search history.

(56) References Cited

U.S. PATENT DOCUMENTS

| | | | | |
|---|---|---|---|---|
| 8,427,420 B2* | 4/2013 | Yamazaki | ............. | G06F 1/1616 345/100 |
| 8,527,891 B2* | 9/2013 | Ma | ......... | G06F 9/4443 715/746 |
| 8,656,299 B2* | 2/2014 | Sugimoto | ............ | G06F 1/1616 715/200 |
| 2003/0071800 A1* | 4/2003 | Vincent | .................... | G02F 1/15 345/204 |
| 2012/0081270 A1* | 4/2012 | Gimpl | ................... | G06F 1/1616 345/1.3 |
| 2012/0124505 A1* | 5/2012 | St. Jacques, Jr. | ...... | G06F 3/0483 715/776 |
| 2013/0106809 A1* | 5/2013 | Ohsaki | .................. | G06F 1/1694 345/204 |
| 2013/0232439 A1* | 9/2013 | Lee | ....................... | G06F 3/0488 715/776 |
| 2014/0053066 A1* | 2/2014 | Imamura | ............... | G06F 3/0483 715/251 |

(Continued)

*Primary Examiner* — Benjamin C Lee
*Assistant Examiner* — Jeffrey S Steinberg
(74) *Attorney, Agent, or Firm* — Oblon, McClelland, Maier & Neustadt, L.L.P.

(57) ABSTRACT

A method and system for deploying an ancillary display screen of an electronic personal display device in rendering digital content item portions, including a persistent rendering thereof. The method comprises receiving a command to modify a page of e-book content, the page including at least one margin indicia as rendered on the primary display screen, activating the ancillary display screen while displaying the modified page bereft of the at least one margin indicia on the primary display screen; and transitioning display of the at least one margin indicia to the ancillary display screen of the computing device.

18 Claims, 5 Drawing Sheets

(56) References Cited

U.S. PATENT DOCUMENTS

| | | | |
|---|---|---|---|
| 2014/0365859 A1* | 12/2014 | Migos | G06F 17/241 715/230 |
| 2015/0009125 A1* | 1/2015 | Kim | G06F 3/0488 345/156 |
| 2015/0185982 A1* | 7/2015 | Hicks | G06F 3/0488 715/776 |
| 2016/0026381 A1* | 1/2016 | Kim | G06F 3/04817 715/761 |

* cited by examiner

METHOD AND SYSTEM FOR PERSISTENT ANCILLARY DISPLAY SCREEN RENDERING

TECHNICAL FIELD

Examples described herein relate to a system and method for deploying an ancillary display screen of an electronic personal display device in rendering digital content item portions, including a persistent rendering thereof.

BACKGROUND

An electronic personal display is a mobile computing device that displays information to a user. While an electronic personal display may be capable of many of the functions of a personal computer, a user can typically interact directly with an electronic personal display without the use of a keyboard that is separate from, or coupled to, but distinct from the electronic personal display itself. Some examples of electronic personal displays include mobile digital devices/tablet computers and electronic readers (e-readers) such (e.g., Apple iPad@, Microsoft® Surface™, Samsung Galaxy Tab® and the like), handheld multimedia smartphones (e.g., Apple iPhone@, Samsung Galaxy S®, and the like), and handheld electronic readers (e.g., Amazon Kindle@, Barnes and Noble Nook@, Kobo Aura HD, Kobo Aura H2O, Kobo GLO and the like).

Some electronic personal display devices are purpose built devices designed to perform especially well at displaying digitally stored content for reading or viewing thereon. For example, a purpose build device may include a display that reduces glare, performs well in high lighting conditions, and/or mimics the look of text as presented via actual discrete pages of paper. While such purpose built devices may excel at displaying content for a user to read, they may also perform other functions, such as displaying images, emitting audio, recording audio, and web surfing, among others.

Electronic personal display devices are among numerous kinds of consumer devices that can receive services and utilize resources across a network service. Such devices can operate applications or provide other functionality that links a device to a particular account of a specific service. For example, the electronic reader (e-reader) devices typically link to an online bookstore, and media playback devices often include applications that enable the user to access an online media electronic library (or e-library). In this context, the user accounts can enable the user to receive the full benefit and functionality of the device.

Yet further, such devices may incorporate a touch screen display having integrated touch sensors and touch sensing functionality, whereby user input commands via touch-based gestures are received thereon.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION

"E-books" are a form of electronic publication content stored in digital format in a computer non-transitory memory, viewable on a computing device having display functionality. An e-book can correspond to, or mimic, the paginated format of a printed publication for viewing, such as provided by printed literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., specialized e-reading application software) to view e-books in a format that mimics the paginated printed publication. Still further, some devices (sometimes labeled as "e-readers") can display digitally-stored content in a more reading-centric manner, while also providing, via a user input interface, the ability to manipulate that content for viewing, such as via discrete pages arranged sequentially (that is, pagination) corresponding to an intended or natural reading progression, or flow, of the content therein.

An "e-reading device", variously referred to herein as an electronic personal display or mobile computing device, can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet computer device, an ultra-mobile computing device, or a wearable computing device with a form factor of a wearable accessory device (e.g., smart watch or bracelet, glass-wear integrated with a computing device, etc.). As another example, an e-reading device can include an e-reader device, such as a purpose-built device that is optimized for an e-reading experience (e.g., with e-Ink displays).

While engaged in an immersive e-reading experience, a combination of factors such as ambient lighting brightness, reflection and glare from the display screen while viewing displayed content may significantly affect reading comfort and enjoyment of the user's reading experience. A user should ideally be able to read comfortably for extended periods of time on the device display screen, to provide a digital reading experience that is comparable to the natural convenience of reading a physical paper book. It would be further preferable that a display screen should consume relatively minimal device battery power, to enable reading for lengthy, immersive periods without having to recharge the device battery.

Figure 1A:
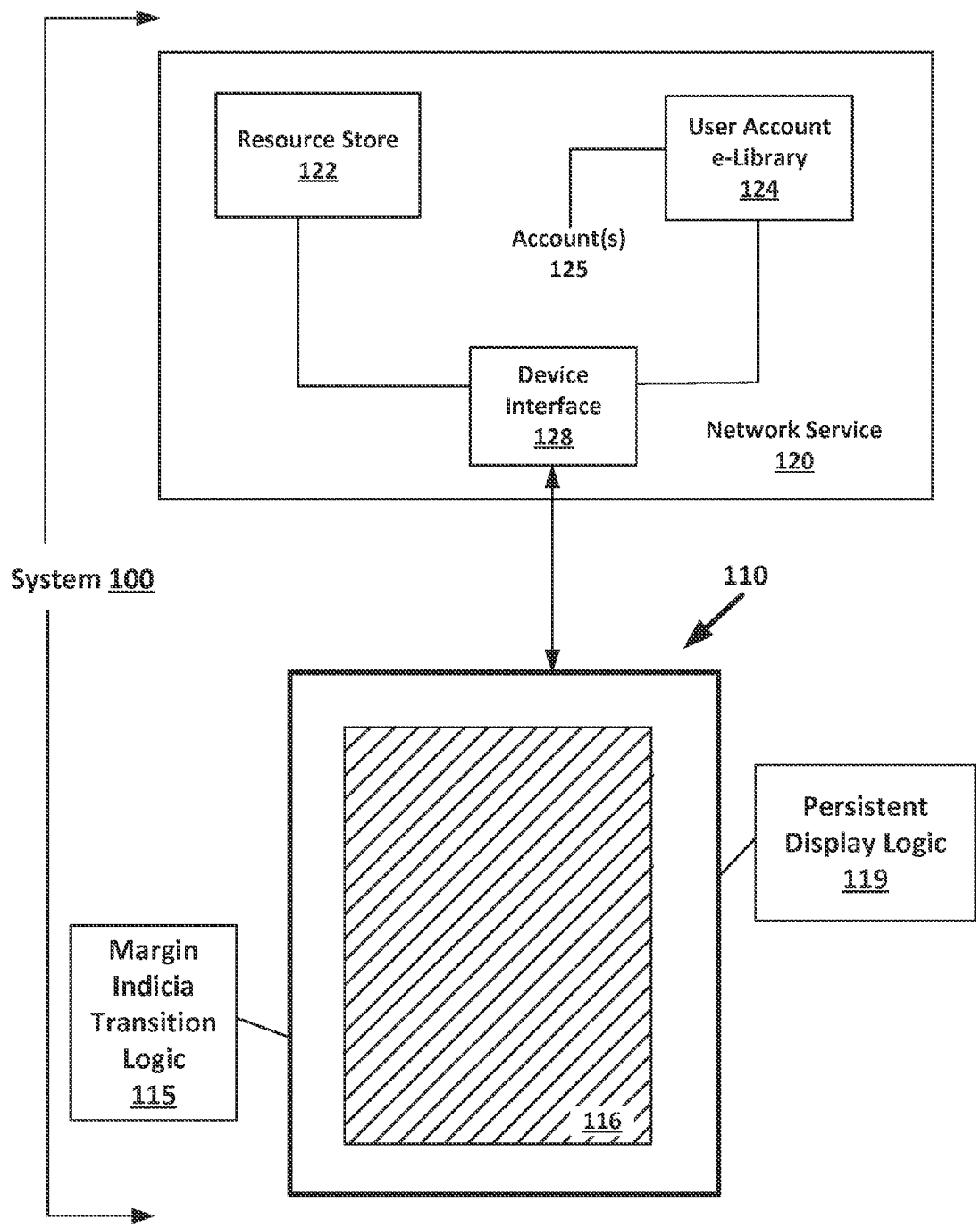
FIGS. 1A, 1B illustrate a computing device configured for operation in transitioning display of e-book page margin indicia to an ancillary display screen, in an embodiment.

FIG. 1A illustrates a system 100 for utilizing applications and providing e-book services on a computing device, according to an embodiment. In an example of FIG. 1A, system 100 includes an electronic personal display device, shown by way of example as an e-reading device 110, and a network service 120. The network service 120 can include multiple servers and other computing resources that provide various services in connection with one or more applications that are installed on the e-reading device 110. By way of example, in one implementation, the network service 120 can provide e-book services in communication with e-reading device 110. The e-book services provided through network service 120 can, for example, include services in which e-books are sold, shared, downloaded or stored. More generally, the network service 120 can provide various other content services, including content rendering services (e.g., streaming media) or other network-application environments or services.

The e-reading device 110 can correspond to any electronic personal display device on which applications and digital content items (e.g., e-books, media files, documents) can be rendered for consumption. For example, the e-reading device 110 can correspond to a tablet or a telephony/messaging device (e.g., smart phone). In one implementation, for example, e-reading device 110 can run an e-reader application that links the device to the network service 120 and enables e-books provided through the service to be viewed and consumed. In another implementation, the e-reading device 110 can run a media playback or streaming application that receives files or streaming data from the network service 120. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an e-ink display.

In additional detail, the network service 120 can include a device interface 128, a resource store 122 and a user e-library 124. User e-library 124 can associate e-reading device 110 with a user and with account 125. Account 125 can also be associated with one or more application resources (e.g., e-books), which can be stored in user electronic library (e-library) 124 containing digital content items. The user account 125 in this manner is associated with ownership of, and accessibility to, one or more e-books and digital content items stored in e-library 124. The device interface 128 can handle requests from the e-reading device 110, and further interface the requests of the device with services and functionality of the network service 120. The device interface 128 can utilize information provided with user account 125 in order to enable services, such as purchasing downloads of content or determining what e-books and content items are associated with the user device. Additionally, the device interface 128 can provide the e-reading device 110 with access to the content store 122, which can include, for example, an online store. The device interface 128 can handle input to identify content items (e.g., e-books), and further to link content items to the account 125 of the user.

Yet further, user e-library 124 can retain metadata for individual accounts 125 to identify resources or content that have been purchased or made available for consumption for a given account. The e-reading device 110 may be associated with the user account 125, and multiple devices may be associated with the same account. As described in greater detail below, the e-reading device 110 can store digital content items (e.g., e-books) that are purchased or otherwise made available to the user of the e-reading device 110, as well as to archive e-books and other digital content items that have been purchased for the user account 125 and are not stored on a particular computing device, but rather at a user's e-library 124 which may be hosted at a remote, cloud-based server system.

Figure 1B:
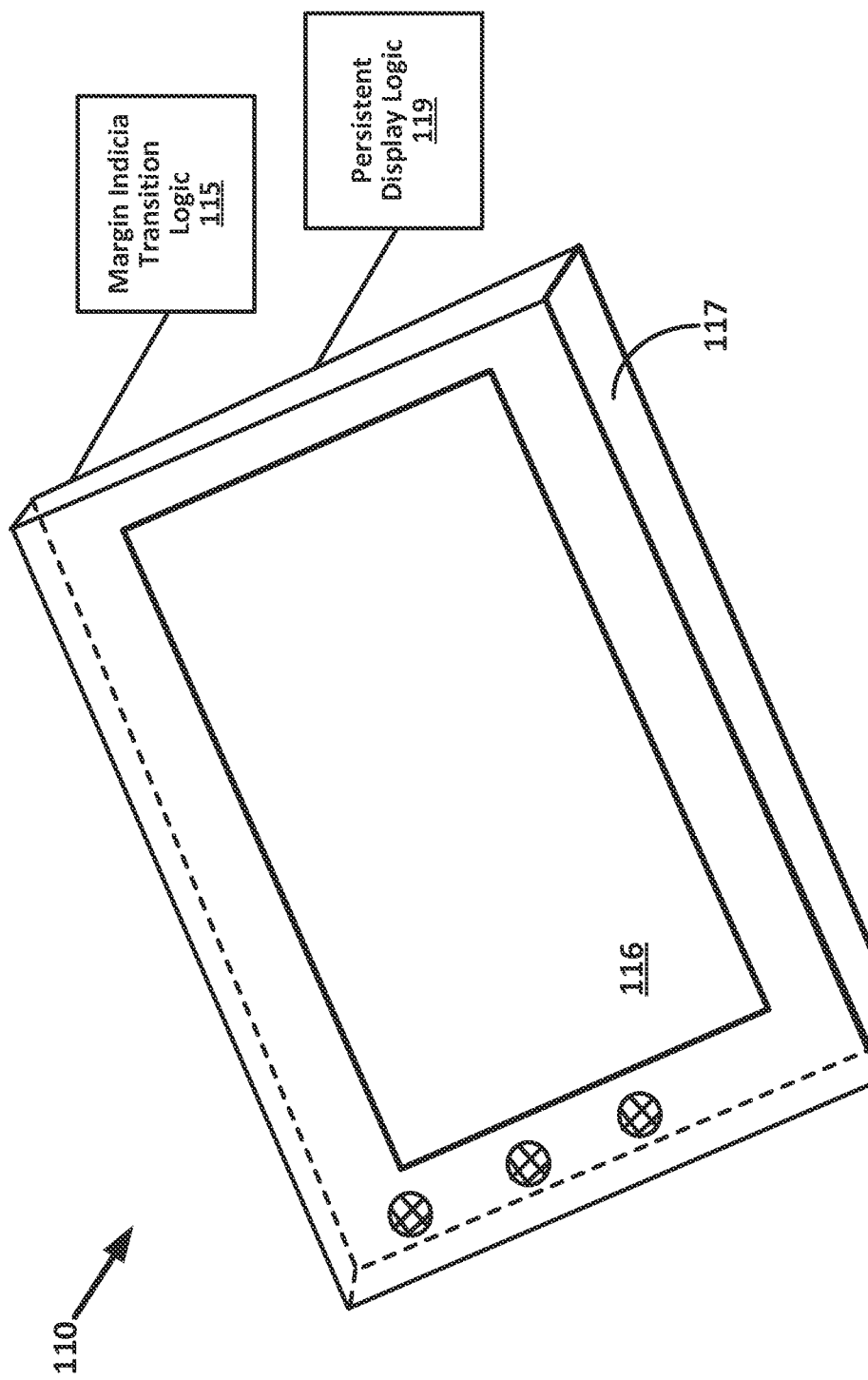

FIG. 1B illustrates a computing mobile device 110, in one embodiment configured for operation of a primary display screen 116 and ancillary display screen 117. In the example of FIG. 1, computing device 110 comprises an electronic personal display device, shown by way of example as e-reading device 110. The terms e-reading device, computing device and electronic personal display device are used interchangeably herein. In some cases, display screen 116 of e-reading device 110 may be a liquid crystal display and ancillary display screen 117 may be an e-ink display or bi-stable display. Ancillary display screen 117 may disposed on an edge surface of computing device 110, generally in an orthogonal plane, or substantially orthogonal plane, relative to the front housing face that includes primary display screen 116. While ancillary display screen 117 is depicted as located on a side edge surface of computing device 110 in FIG. 1B, it is contemplated that ancillary display screen 117 may be located along a top edge surface, a bottom edge surface, or an oppositely disposed side edge surface in other embodiments. In yet further embodiments, ancillary display screen 117 may also be a continuous part of primary display screen 116, but separately operable by being separately electrically functioning such part thereof within computing device 110.

Further with reference to an example depiction of FIG. 1B, the display screens 116, 117 may be touch-sensitive, to process touch inputs including gestures, e.g., a swipe gesture comprising a sustained touch while moving along a particular direction upon the touchscreen surface). For example, the display screens 116, 117 may be integrated with one or more touch sensors to provide a touch-sensing region on their respective display surfaces. For some embodiments, the one or more touch sensors may include capacitive sensors that can sense or detect a human body's capacitance as input. In the example of FIG. 1, the touch-sensing region coincides with a substantial surface area, if not all, of the display screens 116, 117 respectively.

In some embodiments, the e-reading device 110 includes features for providing functionality related to displaying paginated content. The e-reading device 110 can include page transition logic which enables the user to transition through paginated content. The e-reading device 110 can display pages from e-books, and enable the user to transition from one page state to another, including advancing forward or backward within the pages of e-book content. In particular, an e-book can provide content that is rendered according to a sequence of digitally constructed pages, and the e-book can display page states in the form of single pages, multiple pages or portions thereof. In alternate embodiments, the e-book may be an e-magazine or an e-comic book, wherein each of the digitally constructed pages includes several distinctive panels or frames of text and/or images, and reading progression within a page may include navigating in sequential steps from one such panel or frame to another within a same page. Accordingly, a given page state can coincide with, for example, a single page, or two or more pages displayed at once. The page transitioning logic can operate to enable the user to transition from a given page state to another page state. In some implementations, the page transitioning logic enables single page transitions, chapter transitions, or cluster transitions (multiple pages at one time) within the sequence of digitally constructed pages comprising the e-book.

The page transitioning logic can be responsive to various kinds of interfaces and actions in order to enable page transitioning. In one implementation, the user can signal a page transition event to transition page states by, for example, interacting with the touch-sensing region of the display screens 116, 117 of electronic personal display device 110. For example, the user may swipe the surface of the display screens 116, 117 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. Additionally, the page turn input of the user can be provided with a magnitude to indicate a magnitude (e.g., number of pages) in the transition of the page state. For example, a user can touch and hold the surface of the display screen 116 in order to cause a cluster or chapter page state transition, while a tap (as distinguished from a directional swipe, in an embodiment) in the same region can effect a single page state transition (e.g., from one page to the next in sequence). In another example, a user can specify page turns of different kinds or magnitudes through single taps, sequenced taps or patterned taps on the touch sensing region of the display screens 116, 117.

According to some embodiments, the e-reading device 110 includes display sensor logic to detect and interpret user input or user input commands made through interaction with the touch sensors of display screens 116, 117. By way of example, display sensor logic can detect a user making contact with the touch-sensing region of the display screens 116, 117, otherwise referred to herein as a touch event. More specifically, display sensor logic can detect a touch event also referred to herein as a tap, an initial tap held in contact at display screens 116, 117 for longer than some pre-defined threshold duration of time (otherwise known as a "long press" or a "long touch"), multiple taps performed either sequentially or generally simultaneously, swiping gesture actions made through user interaction with the touch sensing region of the display screens 116, 117 or any combination of these gesture actions. Although referred to herein as a "touch" or a tap, it should be appreciated that in some design implementations, sufficient proximity to the screen surface, just short of actual physical contact, may register a "contact" or a "touch event". Furthermore, display sensor logic can interpret such interactions in a variety of ways. For example, each such interaction may be interpreted as a particular type of user input associated with a respective input command, execution of which may trigger a change in state at touchscreen displays 116, 117.

Margin indicia transition logic module 115 provides, in an embodiment, for tracking margin indicia portions of an e-book page displayed on primary screen 116, such as a page number, a chapter number or chapter name designation, or a title of the e-book being displayed, which are typically rendered within a top margin, a bottom margin, and also a side margin of the e-book page being viewed. Margin indicia transition logic module 115 further provides for transitioning of such margin indicia onto ancillary display screen 117 of personal display device 110, thereby enabling a larger portion of substantive e-book content to be presented for viewing on primary display screen 116 upon removal of margin page portions including the margin indicia therefrom. Substantive e-book content as used herein refers to the e-book page content exclusive of the page margins and the margin indicia.

Persistent display logic module 119 includes logic providing, in part, to accomplish activation of touchscreen displays 117 once an input command to remove the e-book page margins is received at processor 210 of computing device 110. In an embodiment, persistent logic display module provides for activation of ancillary display screen 117 in operation in an electrically powered state. Yet further, persistent display logic module 119 includes logic whereby display screen 117 continues to operate in displaying margin indicia even when primary display 116 is de-activated, or even when computing device 110 is partially powered-off with the exclusion of electrical power being supplied to secondary display 117, albeit at a very low power depletion rate.

Persistent display logic module 119 and margin indicia transition logic module 115 can be implemented as software modules comprising instructions stored in a memory of a computing device such as the content store server and or display device 110. One or more embodiments of persistent display logic module 119 and/or margin indicia transition logic module 115 described herein may be implemented using programmatic modules or components. A programmatic module or component may include a program, a subroutine, a portion of a program, or a software or a hardware component capable of performing one or more stated tasks or functions in conjunction with one or more processors. As used herein, a module or component can exist on a hardware component independently of other modules or components. Alternatively, a module or component can be a shared element or process of other modules, programs and hardware components.

Furthermore, the one or more embodiments of persistent display logic module 119 and margin indicia transition logic module 115 described herein may be implemented through instructions that are executable by one or more processors. These instructions may be stored on a computer-readable non-transitory medium. In particular, the numerous computing and communication devices shown with embodiments of the invention include processor(s) and various forms of computer memory, including volatile and non-volatile forms, storing data and instructions. Examples of computer-readable mediums include permanent memory storage devices, such as hard drives on personal computers or servers. Other examples of computer storage mediums include portable storage units, flash or solid-state memory (such as included on many cell phones and consumer electronic devices) and magnetic memory. Computers, terminals, network enabled devices (e.g., mobile devices such as cell phones and wearable computers) are all examples of machines and devices that utilize processors, memory, and instructions stored on computer-readable mediums. Additionally, embodiments may be implemented in the form of computer-programs, or a computer usable storage medium capable of storing such a program.

Figure 2:
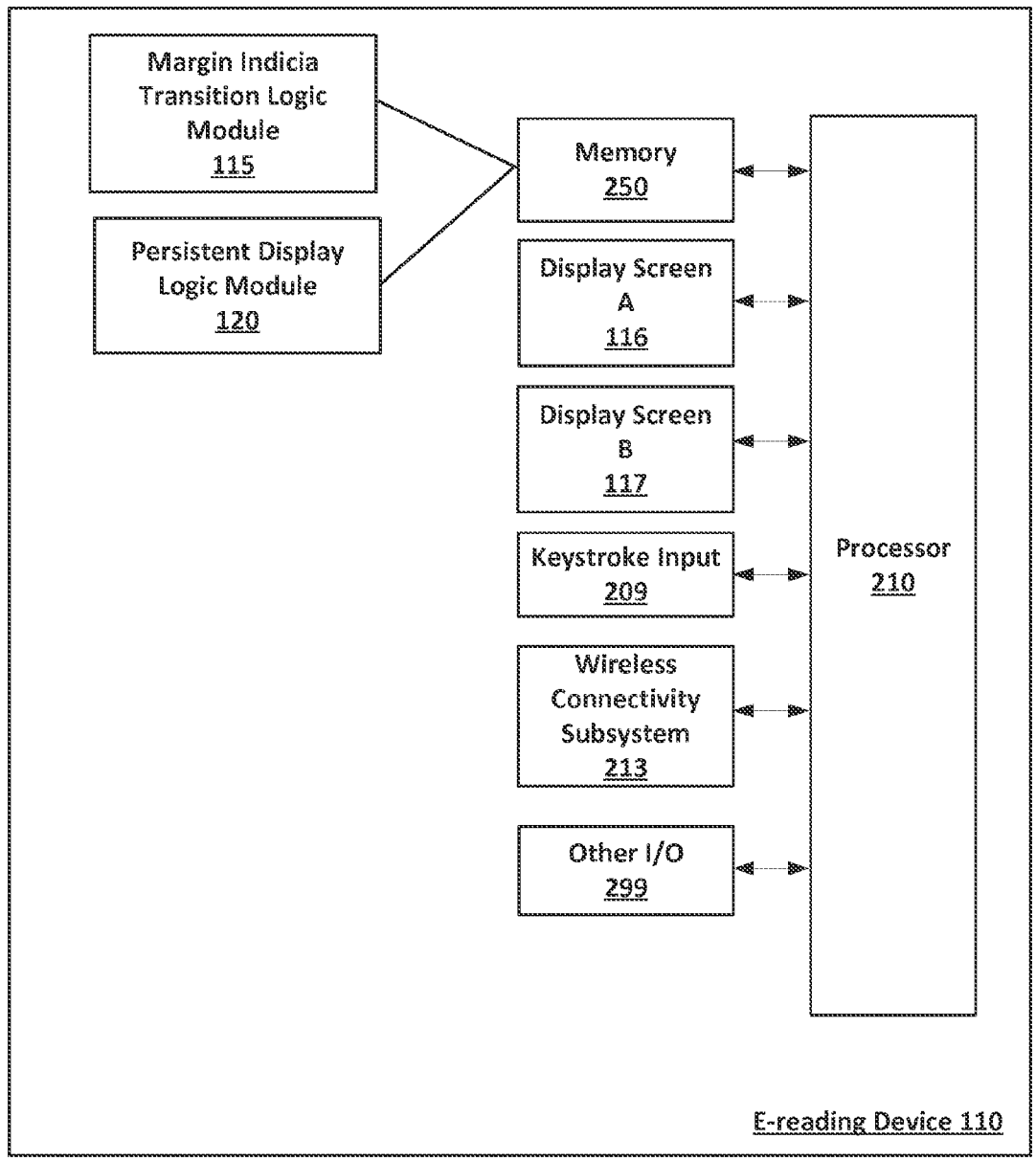
FIG. 2 illustrates a schematic architecture of a computing device configured for operation in transitioning display of an e-book page content item to an ancillary display screen, according to an embodiment.

With reference now to FIG. 2, illustrated is a schematic architecture of a mobile computing device, such as a tablet or e-reader, configured for transitioning display of margin indicia between display screens 116, 117, according to an embodiment.

E-reading device 110 further includes processor 210, a memory 250 storing instructions and logic pertaining at least to display sensor logic, persistent display logic module 119 and margin indicia transition logic module 115.

Processor 210 can implement functionality using the logic and instructions stored in memory 250. Additionally, in some implementations, processor 210 communicates with the network service. More specifically, the e-reading device 110 can access the network service to receive various kinds of resources (e.g., digital content items such as e-books, configuration files, account information), as well as to provide information (e.g., user account information, service requests etc.). For example, e-reading device 110 can receive application resources, such as e-books or media files, that the user elects to purchase or otherwise download via a network service. The application resources, including e-books having content organized as a series of digitally constructed pages, that are downloaded onto the e-reading device 110 can be stored in memory 250.

In some implementations, primary display screen 116 can correspond to, for example, a liquid crystal display (LCD) or light emitting diode (LED) display that illuminates in order to provide content generated from processor 210. In some implementations, display 116 can be touch-sensitive. For example, in some embodiments, one or more of the touch sensor components may be integrated with display 116. In other embodiments, the touch sensor components may be provided (e.g., as a layer) above or below display 116 such that individual touch sensor components track different regions of display 116.

Ancillary display 117, in one embodiment of computing device 110, can correspond to an electronic paper type display, such as an e-ink or bi-stable display that mimics conventional paper in the manner in which content is displayed. Typically, e-ink displays are more suited to e-reading under extreme ambient lighting conditions, such as very bright daylight or in near-darkness at bedtime, for long, immersive periods, resulting is less eye strain as compared to reading, for example, on an LCD display screen. Examples of such electronic paper display technologies include electrophoretic displays, electro-wetting displays, and electro-fluidic displays. Ancillary display 117 can also be touch-sensitive; for example, in some embodiments, one or more of the touch sensor components may be integrated with display 117, providing touch screen capability. Yet further, e-ink displays embodied in ancillary display 117 consume relatively very minimal device battery power in comparison with, for example, an LCD display used in primary display screen 116. In some cases, e-ink displays consume computing device battery power at a less than 10 rate as compared to consumption of an LCD primary screen. For yet this additional reason, an e-ink screen as embodied in ancillary display screen 117 would be very desirable for use as an "always-on" display, even during periods of inactivity between active reading sessions via e-reading device 110, or even when primary screen display 116 is in a power-off state.

Processor 210 can receive input from various sources, including touch sensor components at displays 116, 117, keystroke input 209 such as from a virtual or rendered keyboard, and other input mechanisms 299 (e.g., buttons, mouse, microphone, etc.). With reference to examples described herein, processor 210 can respond to input detected at the touch sensor components. In some embodiments, processor 210 responds to inputs from the touch sensor components in order to facilitate or enhance e-book activities such as generating e-book content on displays 116, 117, performing page transitions of the displayed e-book content, powering off the device 110 and/or displays 116, 117, activating a screen saver, launching or closing an application, and/or otherwise altering a state of displays 116, 117.

In some embodiments, memory 250 may store display sensor logic that monitors for user interactions detected through the touch sensor components, and further processes the user interactions as a particular input or type of input. In an alternative embodiment, display sensor logic module may be integrated with the touch sensor components. For example, the touch sensor components can be provided as a modular component that includes integrated circuits or other hardware logic, and such resources can provide some or all of display sensor logic. In variations, some or all of display sensor logic may be implemented with processor 210 (which utilizes instructions stored in memory 250), or with an alternative processing resource.

E-reading device 110 further includes wireless connectivity subsystem 213, comprising a wireless communication receiver, a transmitter, and associated components, such as one or more embedded or internal antenna elements, local oscillators, and a processing module such as a digital signal processor (DSP) (not shown). As will be apparent to those skilled in the field of communications, the particular design of wireless connectivity subsystem 213 depends on the communication network in which display device 110 is intended to operate, such as in accordance with Wi-Fi, Bluetooth, Near Field Communication (NFC) communication protocols, and the like.

Persistent display logic module 119 can be implemented as a software module, comprising instructions stored in memory 250, on mobile display device 110. In one implementation, the local memory 250 can include records for each e-book in the user's e-library account. The user may have the margin indicia of select e-books archived remotely at a computer server cloud system, so as not to reside in the local memory 250, but be provided by the network service upon request or as needed.

Figure 3:
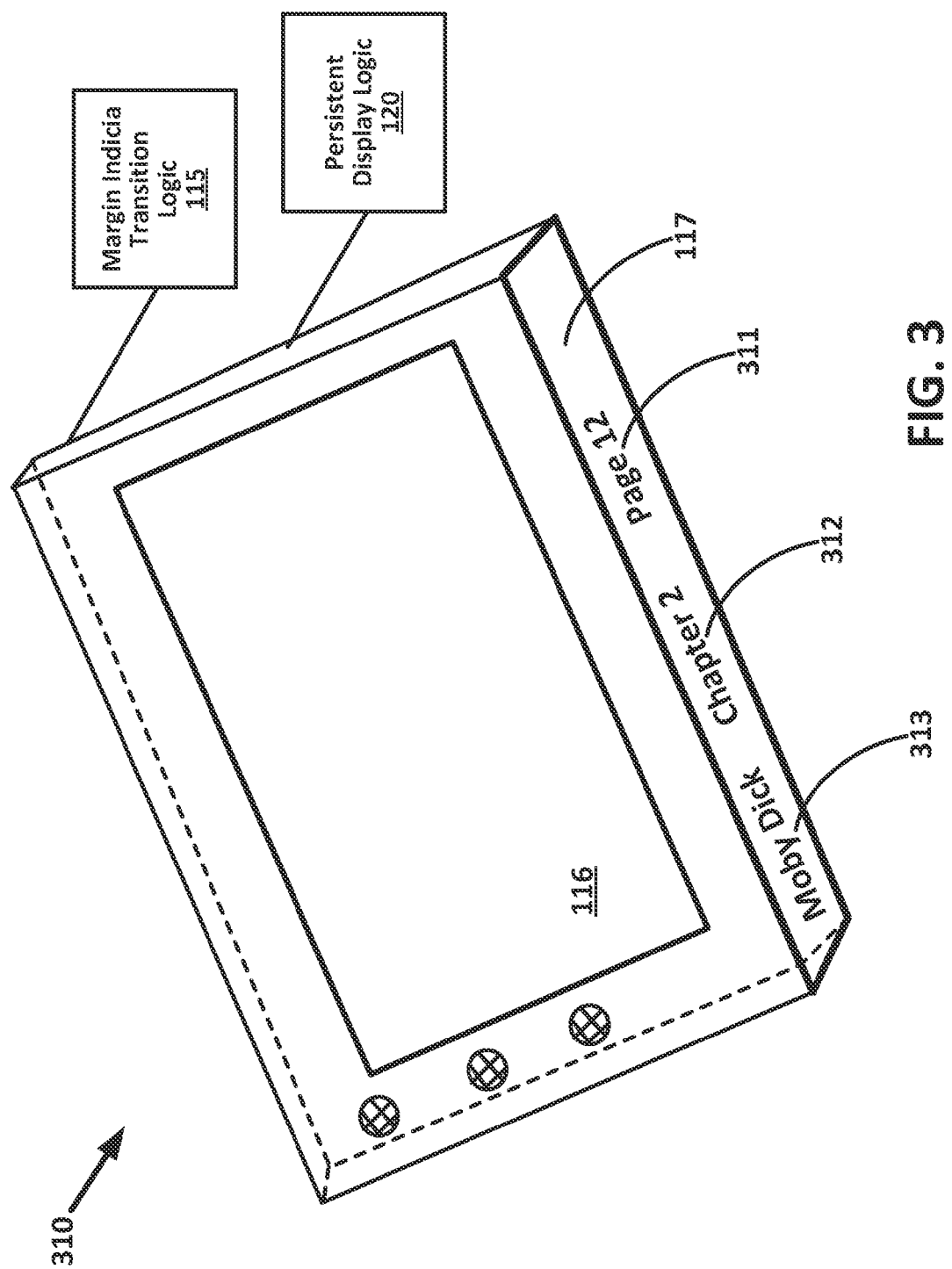
FIG. 3 illustrates an example embodiment in an alternate view of a computing device for operation in transitioning display of an e-book page content item to an ancillary display screen.

Next, in reference to FIG. 3, depicted is an example embodiment in view 310 of an activated ancillary display screen 117 of computing device 110, rendering margin indicia thereon, in lieu of the indicia being rendered on primary display 116. In this manner, the page margins of the e-book pages having the margin indicia included therein can be removed, such that a re-constructed or re-paginated new page including more e-book content, but bereft of margin indicia, can now be displayed on primary display screen 116.

In this case depicted, ancillary display screen 117 is disposed on an edge surface of computing device 110, generally in an orthogonal plane, or substantially orthogonal plane, relative to the front housing face that includes primary display screen 116. Upon receiving a command to modify a page of the e-book content, such as using the page margin "real estate" to display additional substantive content of the e-book pages, margin indicia transition logic module 115 operates in conjunction with persistent display logic module 119 to display margin indicia 311, 312, 313 in lieu of display at primary display 116 once ancillary display screen 117 is activated. Ancillary display screen 117 may be activated via processor 210, whereupon display of the margin indicia is transitioned for displaying and reading upon ancillary display screen 117 of computing device 110.

Optionally, upon transitioning operation of e-reading device 110 for e-reading of e-book content on Ancillary display 117, primary display screen 116 may be de-activated into a lower power mode, such as a sleep mode or power-off mode, for power conservation benefits, at least while rendering the e-book content via ancillary display screen 117.

Figure 4:
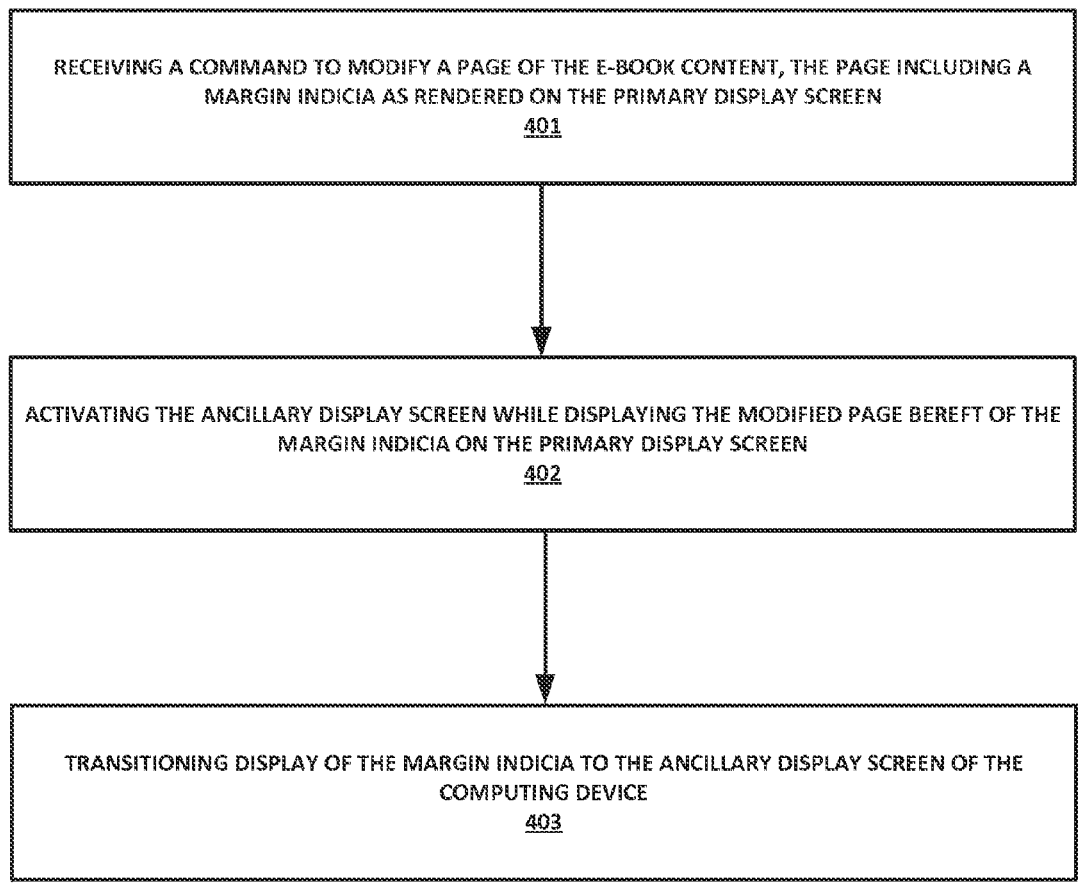
FIG. 4 illustrates a method for operating a computing device to transition display of an e-book page content item to an ancillary display screen, according to an embodiment.

Next with reference to FIG. 4, illustrated is a method for operation in deploying ancillary display screen 117 of computing device 110 for rendering e-book page margin indicia thereon. In describing the example of FIG. 4, reference will be made to components such as described with regard to FIGS. 1a, 1b through 3 for purposes of illustrating components for performing a step or sub-step as described.

At step 401, receiving a command to modify a page of the e-book content, the page including margin indicia 111, 112, 113 as rendered on the primary display screen 116.

At step 402, activating the ancillary display screen 117 while displaying the modified page bereft of the margin indicia 111, 112, 113 on the primary display screen 116.

At step 403, transitioning display of the margin indicia 111, 112, 113 to the ancillary display screen 117 of the computing device.

Yet further, once a user exits the reading experience, and primary display screen 116 is de-activated, powered-off or transitioned to a sleep mode, it is contemplated that ancillary display screen 117 may remain persistently in the activated state, for continued rendering of the margin indicia thereon. Analogous to a reader viewing a spine of conventional paper book they've just closed (or are about to open again) for confirmation regarding that specific book, such a persistently-on state of ancillary screen 117 enables a user to view their e-book reading information as portrayed by the margin indicia being thereon, even with primary display screen 116 de-activated, conceivably with relatively insignificant device 110 power depletion consequences, especially where ancillary screen 117 uses a low-power consumption technology such as an e-ink display screen, and also given the smaller size of ancillary display screen 117 compared to that of primary display screen 116. In one embodiment, ancillary display screen 117 is a fraction of the surface area of primary display screen 116, say 30% or less.

Although illustrative embodiments have been described in detail herein with reference to the accompanying drawings, variations to specific embodiments and details are contemplated and encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method executed in a processor of a computing device, the computing device further including a primary display screen and an ancillary display screen, wherein the ancillary display screen is disposed on an edge surface of the computing device in a substantially orthogonal plane relative to a front housing face that includes the primary display screen, and a memory storing instructions and an e-book, the e-book including a series of digitally constructed pages of content, the method comprising:
  receiving a command to modify a page of the e-book content, the page including at least one margin indicia as rendered on the primary display screen;
  activating the ancillary display screen while displaying the modified page bereft of the at least one margin indicia on the primary display screen; and
  transitioning display of the at least one margin indicia to the ancillary display screen of the computing device.

2. The method of claim 1 wherein the primary display screen comprises a liquid crystal display (LCD) screen.

3. The method of claim 1 wherein the primary display screen comprises a light emitting diode (LED) screen.

4. The method of claim 1 wherein the ancillary display screen is a bi-stable e-ink display screen.

5. The method of claim 1 further comprising de-activating the primary display screen while maintaining the ancillary display screen in an activated state for continued rendering of the at least one margin indicia thereon.

6. The method of claim 5 wherein the primary display screen is de-activated upon powering off the computing device.

7. The method of claim 1 wherein the e-book is one of an e-magazine and an e-comic.

8. The method of claim 1 wherein the margin indicia is one of: a page number, a title of the e-book, a chapter designation of the e-book, and an author name associated with the e-book.

9. The method of claim 1 wherein the ancillary display screen comprises a surface area size less than 30% that of the primary display screen.

10. The method of claim 1 wherein the edge surface is one of: a side edge surface, a top edge surface, and a bottom edge surface.

11. A computing device comprising:
  a memory that stores a set of instructions and an e-book having content arranged in a series of digitally constructed pages;
  a primary display screen and an ancillary display screen, wherein the ancillary display screen is disposed on an edge surface of the computing device in a substantially orthogonal plane relative to a front housing face that includes the primary display screen; and
  a processor that access the instructions in memory, the processor further configured to:
    receive a command to modify a page of the e-book content, the page including at least one margin indicia as rendered on the primary display screen;
    activate the ancillary display screen while displaying the modified page bereft of the at least one margin indicia on the primary display screen; and
    transition display of the at least one margin indicia to the ancillary display screen of the computing device.

12. The computing device of claim 11 wherein the primary display screen comprises a liquid crystal display (LCD) screen.

13. The computing device of claim 11 wherein the ancillary display screen is an e-ink display screen.

14. The computing device of claim 11 wherein the ancillary display screen is a bi-stable display screen.

15. The computing device of claim 11 further wherein the primary display screen is de-activated while maintaining the ancillary display screen in an activated state for continued rendering of the margin indicia thereon.

16. The computing device of claim 15 wherein the primary display screen is de-activated upon powering off the computing device.

17. The computing device of claim 11 wherein the margin indicia is one of: a page number, a title of the e-book, a chapter designation of the e-book, and an author name associated with the e-book.

18. The computing device of claim 11 wherein the ancillary display screen comprises a surface area size less than 30% that of the primary display screen.

* * * * *